United States Patent Office 2,859,251
Patented Nov. 4, 1958

2,859,251
ALKYLATION OF AROMATIC COMPOUNDS

Carl B. Linn, Riverside, Ill., assignor to Universal Oil Products Company, Des Plaines, Ill., a corporation of Delaware No Drawing. Application April 27, 1955
Serial No. 504,376

20 Claims. (Cl. 260—624)

This invention relates to a process for the alkylation of aromatic compounds in the presence of a novel catalyst. More particularly, this invention relates to the alkylation of an alkylatable aromatic compound with an olefin-acting compound at alkylating conditions in the presence of an alkylation catalyst comprising hydrogen fluoride and a complex of boron trifluoride and an iron group metal fluoride.

An object of this invention is to produce alkylated aromatic compounds and particularly to produce alkylated aromatic hydrocarbons. A specific object of this invention is the production of alkylated aromatic hydrocarbons within the gasoline boiling range having high antiknock values which may be utilized as such or as components of gasoline suitable for use in airplane and automobile engines. Another object of this invention is to produce aromatic compounds useful per se or as intermediates in the production of plastics, resins, and other organic materials. Thus, a specific object of this invention is the production of cumene by the alkylation of benzene with propylene in the presence of a novel catalyst, which cumene product is then oxidized to form cumene hydroperoxide which is decomposed into phenol and acetone. Also, an object of this invention is to furnish a process for the alkylation of p-cresol with tert-butyl alcohol to form 2,6-di-tert-butyl-4-methylphenol which is a very effective antioxidant for preventing the deterioration of organic substances due to oxygen. Other objects of this invention will be set forth hereinafter as part of the specifications and accompanying examples.

Numerous catalysts have been proposed for the alkylation of aromatic compounds with olefin-acting compounds including liquid catalysts such as sulfuric acid, phosphoric acid, fluosulfonic acid, chlorosulfonic acid, hydrogen fluoride, etc. Similarly, solid catalysts such as aluminum bromide, metal oxides, metal sulfides, clays, etc., have been proposed. Each of the prior art catalysts has suffered from at least one inherent disadvantage and it is a further object of this invention to provide an alkylation catalyst which overcomes each and all of such disadvantages. For example, the prior art teaches that the above-mentioned liquid catalysts are not satisfactory catalysts for the reaction of certain aromatic compounds with certain olefin-acting compounds. In addition, sulfuric acid has the inherent disadvantage that rapid deterioration of the catalyst takes place during use.

Aluminum chloride is at least partially soluble in aromatic hydrocarbons under the conditions used for alkylation and thus cannot be readily utilized in a fixed bed operation even though the aluminum chloride may have been impregnated prior to use on an inert support. Aluminum bromide, as is well known, will be even much more soluble in aromatic hydrocarbons than is aluminum chloride. Further, extensive sludge formation, an undesirable side reaction, occurs when aluminum chloride is used for the alkylation of aromatic compounds. Metal oxides, clays, solid phosphoric acid, etc., which are stable solid catalysts can only be utilized at high temperatures and high pressures or both. Use of the novel catalyst composition of the present invention overcomes these and other advantages which are well known to one skilled in the art.

In one embodiment the present invention relates to the alkylation of an alkylatable aromatic compound with an olefin-acting compound at alkylating conditions in the presence of a catalyst comprising hydrogen fluoride and a complex of boron trihalide and an iron group metal halide.

Another embodiment of the present invention relates to the alkylation of a monocyclic aromatic compound with an olefin-acting compound at alkylating conditions in the presence of a catalyst comprising hydrogen fluoride and a complex of boron trifluoride and an iron group metal fluoride.

A further embodiment of the present invention relates to the alkylation of an alkylatable aromatic hydrocarbon with an olefin-acting compound at alkylating conditions in the presence of a catalyst comprising hydrogen fluoride and a complex of boron trifluoride and an iron group metal fluoride.

A still further embodiment of this invention relates to the alkylation of a benzene hydrocarbon with an olefin-acting compound at alkylating conditions in the presence of a catalyst comprising hydrogen fluoride and a complex of boron trifluoride and an iron group metal fluoride.

A specific embodiment of the present invention relates to an alkylation of benzene with ethylene at alkylating conditions in the presence of a catalyst comprising hydrogen fluoride and a complex of boron trifluoride and ferrous fluoride.

Another specific embodiment of the present invention relates to the alkylation of benzene with propylene at alkylating conditions in the presence of a catalyst comprising hydrogen fluoride and a complex of boron trifluoride and ferrous fluoride.

A still further embodiment of the present invention relates to the alkylation of toluene with propylene at alkylating conditions in the presence of a catalyst comprising hydrogen fluoride and a complex of boron trifluoride and ferrous fluoride.

An additional specific embodiment of the present invention relates to the alkylation of p-cresol with tert-butyl alcohol at alkylating conditions in the presence of a catalyst comprising hydrogen fluoride and a complex of boron trifluoride and ferrous fluoride.

Other embodiment of the present invention will become apparent in considering the specifications as hereinafter set forth.

I have found that a catalyst composition useful in the alkylation of aromatic compounds reaction may be prepared by admixing hydrogen fluoride and a complex of boron trifluoride and an iron group metal fluoride. While the catalyst of the present invention includes hydrogen fluoride, the catalyst possesses properties superior to those of hydrogen fluoride alone. The superior properties apparently result from a peculiar association of the hydrogen fluoride and the other components of the composition. As will be illustrated in the examples appended to the present specification, the catalyst of the present invention gives results different than by the use of hydrogen fluoride alone. These same differences may also prevail in comparison with catalysts comprising mixtures of hydrogen fluoride and boron trifluoride. As hereinbefore set forth, the novel catalyst for the alkylation of aromatic compounds reaction includes a complex of boron trifluoride and an iron group metal fluoride. The metal fluoride preferably comprises iron fluoride. Other iron group metal fluorides included within the scope of the present invention are cobalt fluoride and nickel fluoride but not necessarily with equivalent results. In general, the metals in the metal fluorides which are in the low valence state appear to be more effective and are preferred. This includes particularly ferrous fluoride. Similarly, cobaltous fluoride and nickelous fluoride are more effective. Other complexes of boron trifluoride and metal fluorides with such metals as chromium, molybdenum, tungsten, vanadium, titanium, manganese, zirconium, etc., can be prepared and utilized but not necessarily with the equivalent results to the preferred iron group metal fluorides.

The preferred catalyst composition for the alkylation of aromatic compounds reaction comprises hydrogen fluoride and a complex of boron trifluoride and ferrous fluoride. This composition analyzes as $FeF_5B$ and is believed to be one of the formula $FeF_2 \cdot BF_3$. However, the catalyst may also include complexes containing two and possibly more $BF_3$ constituents complexed with ferrous fluoride. Also, it is possible that one $BF_3$ constituent may be complexed with two or perhaps more metal fluoride components, thus effecting the necessary association of these components in order to produce the desired catalytic properties for the alkylation of aromatic compounds reaction. From a consideration of the theoretical formula hereinabove set forth and from consideration of the method in which the complex is prepared, as well as the stability of boron trifluoride, it is believed that the boron trifluoride constituent is present as such in the complex and does not become dissociated.

The complex of boron trifluoride and ferrous fluoride is a nonfuming white solid and is stable at ordinary temperature and pressure. However, it loses boron trifluoride when heated, gradually at first and substantially at 50° C. at atmospheric pressure. Therefore, the complex should not be heated to high temperature at atmospheric pressure. However, when it is desired to heat the complex and to conduct the alkylation of aromatic compounds reaction at elevated temperatures, the heating and reaction should be effected under sufficient pressure to preclude the loss of boron trifluoride.

The complex may be formed in any suitable manner. In one method, hydrogen fluoride is reacted with iron to form ferrous fluoride and the latter is then reacted with boron trifluoride to form the complex. In another method, hydrogen fluoride and boron trifluoride are contacted simultaneously with iron. In preparing the complex, it apparently is necessary that an environment of hydrogen fluoride be present during the addition of the boron trifluoride. Therefore, when the hydrogen fluoride is added first and then the boron trifluoride, sufficient hydrogen fluoride should be present in the system in order to effect the formation of the desired complex. The iron preferably is in the finely divided state and comprises iron powder. The reaction is exothermic and yields one mol of hydrogen for each gram atom of iron. It will be noted that the preferred reaction entails two mols of hydrogen fluoride and one mol each of iron and boron trifluoride.

The complex as formed in the above manner may be utilized for the alkylation of aromatic compounds reaction either as a liquid solution in hydrogen fluoride or as a solid mass along with hydrogen fluoride. When utilized as a liquid, an excess of hydrogen fluoride will be used in forming the solution. An excess of the solid complex over that which is soluble in hydrogen fluoride may be employed and the catalyst will then comprise a solid or a mixture of liquid and solid phases, the latter being useful in a slurry type operation. When utilized as a solid mass, the complex itself may be disposed as a fixed bed in a reaction zone and the hydrogen fluoride introduced into the reaction zone in any suitable manner, such as, continuously or intermittently. In any event, it is understood that the hydrogen fluoride may be used as a liquid and/or gas in preparing the complex or during the processing operation.

Another feature of the present invention is that the complex may be utilized as a solid mass, or, as a composite with a suitable supporting material. The supporting material preferably is porous and is not reactive with hydrogen fluoride. A particularly preferred supporting material for the complex comprises activated charcoal. Other supporting materials may comprise certain metal fluorides, for example, aluminum fluoride, calcium fluoride, magnesium fluoride, strontium fluoride, barium fluoride, etc. A composite of complex and support may be prepared in any suitable manner.

It is understood that the support for the complex may comprise other metal fluorides which will not be dissolved, removed, or otherwise adversely affected upon contact with a hydrogen halide, and particularly hydrogen fluoride, utilized as a component of this alkylation of aromatic compounds reaction catalyst. Similarly, the other halides including chloride, bromide, and/or iodide, of the metals specifically set forth hereinabove or other materials may be utilized provided they met the requirements hereinabove set forth. Furthermore, metal oxides and other metal compounds may be employed provided they will retain satisfactory physical properties during use. In some cases, the metal oxide or other metal compound may in part react with hydrogen halide but will retain its physical properties to provide a suitable supporting material. It is understood that the various supports are not necessarily equivalent and that the particular support to be utilized will be selected with regard to the specific complex and hydrogen halide utilized as the catalyst.

While the specific instructions hereinabove set forth are directed to the preparation of a complex of iron fluoride and boron trifluoride, it is understood that the complex of cobalt fluoride with boron trifluoride and the complex of nickel fluoride with boron trifluoride may be employed but not necessarily with equivalent results. The complex containing cobalt and the complex containing nickel may be prepared in substantially the same manner as described in connection with the preparation of the complex containing iron. Similarly, while the preferred complex of the present invention contains fluorine as the halogen, it is to be understood that in certain cases, the complex may contain one or more of the other halogens, namely, chlorine, bromine, and iodine, but not necessarily wtih equivalent results. Furthermore, it is understood that suitable modifications will be made when necessary in preparing these other complexes. In some cases, the complex may contain two or more metals, particularly of the iron group, and/or two or more halogens.

In addition to the complex described hereinabove, to form the catalyst for this alkylation of aromatic compounds reaction, hydrogen fluoride is admixed therewith. While hydrogen fluoride generally is preferred, it is understood that other hydrogen halides, including hydrogen chloride, hydrogen bromide, and hydrogen iodide, or mixtures thereof with themselves or with hydrogen fluoride may be employed. Furthermore, it is understood that certain halogen containing compounds which release hydrogen halide under reaction conditions may be utilized in place of or along with the hydrogen halide compound, particularly hydrogen fluoride. Examples of suitable halogen-containing compounds are the alkyl halides, including alkyl fluorides, alkyl chlorides, alkyl bromides and alkyl iodides. Specific alkyl halides include ethyl fluoride, propyl fluoride, butyl fluoride, amyl fluoride, hexyl fluoride, etc., ethyl chloride, propyl chloride, butyl chloride, amyl chloride, hexyl chloride, etc., ethyl bromide, propyl bromide, butyl bromide, amyl bromide, etc., ethyl iodide, propyl iodide, butyl iodide, amyl iodide, etc., or mixtures thereof. It is understood that polyhaloalkane compounds, halocyclic compounds, and/or polyhalocyclic compounds may be utilized in some cases. Furthermore, it is understood that these various modifications are not necessarily equivalent and that suitable modification in operation may be necessary to accommodate these changes.

As hereinbefore set forth, the novel catalyst for the alkylation of aromatic compounds reaction process of the present invention comprises hydrogen fluoride and the complex. As will be illustrated in the following examples, the combination of hydrogen fluoride and the complex is a very powerful catalyst for this reaction. The proportions of hydrogen fluoride and complex may vary over a wide range as, for example, from 0.01 to 1 or less to 200 to 1 or more and preferably from 0.5 to 1 to 150 to 1 molar proportions of hydrogen fluoride per molar proportions of complex. The specific proportions will depend upon whether the complex is utilized as a solution in hydrogen fluoride, as a slurry along with a solution, or as a solid mass.

As hereinabove set forth, the present invention relates to a process for the alkylation of an alkylatable aromatic compound with an olefin-acting compound at alkylating conditions in the presence of a catalyst comprising hydrogen fluoride and a complex of boron trifluoride and an iron group metal fluoride. Many aromatic compounds are utilizable as starting materials. Preferred aromatic compounds are aromatic hydrocarbons, and particularly monocyclic aromatic hydrocarbons, that is, benzene hydrocarbons. Suitable aromatic compounds include aromatic hydrocarbons such as benzene, toluene, m-xylene, o-xylene, p-xylene, ethylbenzene, 1,2,3-trimethylbenzene or mesitylene, o-ethyltoluene, m-ethyltoluene, p-ethyltoluene, n-propylbenzene, isopropylbenzene or cumene, etc. Higher molecular weight alkylaromatic hydrocarbons are also suitable such as those produced by the alkylation of aromatic hydrocarbons with olefinic polymers. Such products are referred to in the art as alkylate, and include hexylbenzene, hexyltoluene, nonylbenzene, nonyltoluene, dodecylbenzene, dodecyltoluene, etc. Very often alkylate is obtained as a high boiling fraction in which case the alkyl group attached to the aromatic hydrocarbon varies in size from $C_9$ to $C_{18}$. Other suitable alkylatable aromatic hydrocarbons include those containing an unsaturated side chain such as styrene, vinyl toluene, allyl benzene, etc. Still other suitable utilizable aromatic hydrocarbons include those with two or more aryl groups such as diphenyl, diphenylmethane, triphenylmethane, fluorene, stilbene, etc. Examples of suitable alkylatable aromatic compounds which contain condensed benzene rings include naphthalene, anthracene, phenanthrene, naphthacene, rubrene, etc.

Aromatic hydrocarbon derivatives which may be used as starting materials in the process of this invention include aromatic nitro compounds, aromatic sulfonic acids, aromatic amines, phenols, aromatic halogen compounds, aromatic carboxylic acids, aromatic aldehydes, and aromatic ketones. Typical utilizable aromatic nitro compounds include nitrobenzene, o-dinitrobenzene, m-dinitrobenzene, p-dinitrobenzene, 1,3,5-trinitrobenzene, o-nitrotoluene, m-nitrotoluene, p-nitrotoluene, 2,4-dinitrotoluene, 2,4,6-trinitrotoluene, 2,4,6-trinitro-m-xylene, picric acid, 2,4,6-trinitroresorcinol, tetryl, o-nitrochlorobenzene, m-nitrochlorobenzene, p-nitrochlorobenzene, 2,4-dinitrochlorobenzene, picryl chloride, o-nitrodiphenyl, p-nitrodiphenyl, etc. Certain of the reduction products of aromatic nitro compounds are also utilizable in the process of this invention. Such intermediate reduction products include nitrosobenzene, phenyl-hydroxyl amine, azoxybenzene, azobenzene, hydrazobenzene, etc.

Suitable utilizable aromatic sulfonic acids include benzene sulfonic acid, o-tolylsulfonic acid, m-tolyl sulfonic acid, p-tolylsulfonic acid, various xylene sulfonic aicds, dodecylbenzene sulfonic acids, dodecyltoluene sulfonic acids, etc. Acid chlorides formed by the reaction of aromatic acids with phosphorus halides are also utilizable. The esters, sulfonamides and chloroamides formed from aromatic sulfonic acids may also be used as well as nitriles, and sulfinic acids.

Utilizable aromatic amines include aniline, methylaniline, dimethylaniline, diethylaniline, o-toluidine, m-toluidine, p-toluidine, o-nitroaniline, m-nitroaniline, p-nitroaniline, 2,4-dinitroaniline, o-phenylene diamine, m-phenylene diamine, p-phenylene diamine, o-anisidine, p-anisidine, p-phenetidine, o-chloroaniline, m-chloroaniline, p-chloroaniline, p-bromoaniline, 2,4,6-trichloroaniline, 2,4,6-tribromoaniline, diphenylamine, triphenylamine, benzylidine, o-toluidine, o-dianisidine, etc. The acid salts and acetyl derivatives of the various aromatic amines may also be utilized.

Typical utilizable phenols or hydroxyaromatic compounds include phenol itself, o-cresol, m-cresol, p-cresole, o-chlorophenol, p-chlorophenol, m-chlorophenol, p-bromophenol, 2,4,6-trichlorophenol, 2,4,6-tribromophenol, o-nitrophenol, m-nitrophenol, p-nitrophenol, 2,4-dinitrophenol, guiacol, anol, isoeugenol, eugenol, saligenin, carvacrol, thymol, o-hydroxyacetophenone, o-hydroxydiphenyl, p-hydroxydiphenyl, o-cyclohexylphenol, p-cyclohexylphenol, catechol, resorcinol, hydroquinone, pyrogallol, hydroxyhydroquinone, phloroglucinol, o-aminophenol, m-aminophenol, p-aminophenol, etc.

Aromatic halogen compounds utilizable in the scope of this invention include fluorobenzene, chlorobenzene, bromobenzene, iodobenzene, o-chlorotoluene, m-chlorotoluene, p-chlorotoluene, o-bromotoluene, p-bromotoluene, m-bromotoluene, o-bromoanisole, p-bromodimethylaniline, o-dinitrobenzene, p-dichlorobenzene, 1,2,4-trichlorobenzene, 1,2,3,4-tetrachlorobenzene, 1,2,4,5-tetrachlorobenzene, p-dibromobenzene, o-bromochlorobenzene, p-bromochlorobenzene, o-bromoiodobenzene, p-bromoiodobenzene, p-chloroiodobenzene, etc.

Utilizable aromatic carboxylic acids include benzoic acid, o-toluic acid, m-toluic acid, p-toluic acid, o-chlorobenzoic acid, m-chlorobenzoic acid, p-chlorobenzoic acid, o-bromobenzoic acid, m-bromobenzoic acid, p-bromobenzoic acid, o-nitrobenzoic acid, p-nitrobenzoic acid, 3,5-dinitrobenzoic acid, salicylic acid, m-hydroxybenzoic acid, p-hydroxybenzoic acid, anisic acid, gallic acid, syringic acid, anthranilic acid, m-aminobenzoic acid, p-aminobenzoic acid, etc. Utilizable derivatives of benzoic acid include methylbenzoate, benzoic anhydride, benzoyl chloride, perbenzoic acid, dibenzoyl peroxide, benzamide, benzanilide, benzhydrazide, etc. Utilizable polybasic acids and derivatives thereof include phthalic acid, phthalic anhydride, isophthalic acid, terephthalic acid, hemimellitic acid, trimellitic acid, trimesic acid, prehnitic acid, mellophanic acid, pyromellitic acid, benzene pentacarboxylic acid, mellitic acid, diphenic acid, etc. Also, benzene derivatives with acidic side chains may be used; for example, phenylacetic acid, hydrocinnamic acid, omega-phenyl-n-caproic acid, cinnamic acid, phenyl propionic acid, homophthalic acid, o-phenylene diacetic acid, m-phenylene diacetic acid, p-phenylene diacetic acid, o-phenylene acetic-beta-propionic acid, etc.

Utilizable aromatic aldehydes and ketones include benzaldehyde, m-tolualdehyde, p-tolualdehyde, o-chlorobenzaldehyde, p-chlorobenzaldehyde, o-nitrobenzaldehyde, m-nitrobenzaldehyde, p-nitrobenzaldehyde, o-aminobenzaldehyde, p-aminobenzaldehyde, salicylaldehyde, m-hydroxybenzaldehyde, p-hydroxybenzaldehyde, o-methoxybenzaldehyde, anisaldehyde, p-dimethylaminobenzaldehyde, 2,6-dichlorobenzaldehyde, vanillin, acetophenone, propiophenone, benzophenone, fluoroacetophenone, p-dimethylaminobenzophenone, etc.

By the term aromatic compound I mean to include not only benzene derivatives, naphthalene derivatives, and the like, but also all aromatic compounds containing a stable ring or nucleus such as is present in benzene, and which possesses unsaturation in the sense that benzene does. Consequently, it can be seen that the term aromatic compound, in the sense in which it is used in this specification and the appended claims, includes not only carbocyclic compounds but also heterocyclic compounds having a stable nucleus. The carbocyclic compounds may have a benzene, naphthalene, anthracene, etc. nucleus. The heterocyclic aromatic compounds may have a pyridine, furan, thiophene, pyrrole, pyrazole, etc., nucleus. In addition, the aromatic compounds contemplated for use in my process may contain both a carbocyclic and a heterocyclic ring such as is found in indole and in carbazole. Also, the aromatic compounds may contain both a benzene nucleus and a cycloalkane nucleus such as is found in tetralin and in indan.

Suitable alkylating agents which may be charged in this process are olefin-acting compounds including monoolefins, diolefins, polyolefins, also alcohols, ethers, esters, the latter including alkyl halides, alkylphosphates, certain alkylsulfates, and also esters of various organocarboxylic acids. The preferred olefin-acting compounds are olefinic hydrocarbons which comprise monoolefins having one double bond per molecule and polyolefins which have more than one double bond per molecule. Monoolefins which may be utilized for alkylating aromatic compounds in the presence of a catalyst comprising hydrogen fluoride and a complex of boron trifluoride and an iron group metal fluoride are either normally gaseous or normally liquid and include ethylene, propylene, 1-butene, 2-butene, isobutylene, pentenes, and higher normally liquid olefins, the latter including various olefin polymers having from 6 to 18 carbon atoms per molecule. Cycloolefins such as cyclopentene, cyclohexene, and various alkylcycloolefins, such as methylcyclopentene, methylcyclohexene, etc., may also be utilized but generally not under the exact same conditions of operation applying to the noncyclic olefins. The polyolefinic hydrocarbons utilizable in the process of the present invention include conjugated diolefins, such as butadiene and isoprene, as well as nonconjugated diolefins and other polyolefinic hydrocarbons containing more than two double bonds per molecule.

Alkylation of the above alkylatable aromatic compounds may also be effected in the presence of the hereinabove referred to catalyst by reacting aromatic compounds with certain substances capable of producing olefinic hydrocarbons under the conditions of operation chosen for the process. Such olefin-producing substances include alykyl halides capable of undergoing dehydrohalogenation to form olefinic hydrocarbons containing at least two carbon atoms per molecule. The alkyl halides comprise the particularly desirable group of compounds which act as olefins in admixture with alkylatable aromatic compounds in the presence of the catalyst of the present type, since in the reaction, hydrogen halide is also produced, which hydrogen halide is a necessary component of the catalyst of the present invention. In each case, the olefinic hydrocarbons and the above-mentioned olefin-producing substances are herein referred to as olefin-acting compounds.

In accordance with the process of the present invention, the alkylation of aromatic compounds reaction to produce aromatic compounds of higher molecular weight than the compounds charged to the process is effected in the presence of the above-indicated catalyst at a temperature of from about −60° C. or lower to about 300° C. or higher, and preferably from about 0° C. to about 200° C., although the exact temperature needed for a particular aromatic compound alkylation reaction will depend upon the specific reactants employed.

The alkylation reaction is usually carried out at a pressure of from about substantially atmospheric to about 100 atmospheres, and preferably under sufficient pressure to maintain the reactants and the products in substantially liquid phase and to maintain the complex as such so that boron trifluoride is not lost therefrom. Referring to the aromatic compound subjected to the alkylation, it is preferable to have present from two to ten or more, sometimes up to twenty molecular proportions of alkylatable aromatic compound per one molecular proportion of olefin-acting compound introduced thereto, particularly olefin hydrocarbon. The higher molecular ratios of alkylatable aromatic compound to olefin are especially desirable when the olefin employed in the alkylation is a high molecular weight olefin boiling generally higher than pentenes, since these olefins frequently undergo depolymerization prior to or substantially simultaneously with alkylation so that one molecular proportion of such an olefin can thus alkylate two or more molecular proportions of the alkylatable aromatic compound. The higher molecular ratios of alkylatable aromatic compound to olefin also tends to produce the formation of polyalkylated products because of the operation of the law of mass action under these conditions. In some cases it may be desirable to maintain or employ an atmosphere of hydrogen within the reaction.

In converting aromatic compounds to effect alkylation thereof with the type of catalyst herein described, either batch or continuous operations may be employed. The actual operation of the process admits of some modification depending upon the normal phase of the reacting constituents, the use of the catalyst as a liquid or as a solid, per se or on a support, and whether batch or continuous operations are employed. In a sample type of batch operation an aromatic compound to be alkylated, such as, for example, benzene, is brought to a temperature and pressure within the approximate range specified in the presence of a catalyst comprising hydrogen fluoride and a complex of boron trifluoride and iron group metal fluoride having a concentration corresponding to a sufficiently high activity and its alkylation is effected by the gradual introduction under pressure of an olefin such as, for example, isobutylene in a manner to attain contact between catalyst and reaction compounds.

In another method of operation, the aromatic compound may be mixed with an olefin at a suitable temperature, a catalyst comprising hydrogen fluoride and a complex of boron trifluoride and an iron group metal fluoride, such as ferrous fluoride, is added and the reaction of alkylation induced by a sufficiently long contact with the catalyst. Alkylation may be allowed to progress to different stages depending upon contact time. In the case of alkylation of benzene with normally gaseous olefins, the best products are produced by the condensation of equimolecular quantities of aromatic compounds and olefins. After a batch treatment, the hydrogen fluoride component of the catalyst is removed in any suitable manner, such as by distillation or quenching with water, and the organic fraction or layer is then removed by decantation in some instances, and is subjected to fractionation for the recovery of the desired reaction products.

In one type of continuous operation, a liquid aromatic hydrocarbon such as benzene, containing dissolved therein a requisite amount of hydrogen fluoride, may be pumped through a reactor containing the solid complex per se or impregnated on a suitable support. The olefin-acting compound may be added to the aromatic compound stream just prior to contact of this stream with the solid catalyst bed, or it may be introduced in multistages at various points in the catalyst bed. It is also within the scope of the present invention to add the hydrogen fluoride component of the catalyst of the present invention continuously or intermittently. In some cases, only sufficient hydrogen fluoride to form the desired catalyst in situ with the solid complex per se or on a support is necessary. In such an operation the original aromatic compound stream such as benzene may contain sufficient dissolved hydrogen fluoride to produce the desired catalyst in situ and after this desired catalyst is formed in situ, the aromatic compound stream can be utilized without prior contacting or combination with hydrogen fluoride. The details of continuous processes of this general character are familiar to those skilled in the alkylation of aromatic compounds art and any necessary additions or modifications of the above general procedures will be more or less obvious and can be made without departing from the generally broad scope of the invention.

The process of the present invention is illustrated by the following examples which are introduced for the purpose of illustration and with no intention of unduly limiting the generally broad scope of the present invention.

EXAMPLE I

A complex was prepared by the general method of placing 28 grams of iron powder and 88 grams of anhydrous hydrogen fluoride in a copper lined steel autoclave. The autoclave was heated to about 100° C., and rotated for about one-half hour, following which it was allowed to cool and hydrogen formed during the reaction was released. 61 grams of boron trifluoride was then pressured into the autoclave which subsequently was rotated for 20 hours at 23° C. 82 grams of complex were recovered as a white solid. The analysis of the complex is as follows: calculated for $FeF_2BF_3$: 34.6% iron, 58.7% fluorine, and 7.6% boron. The complex analyzed 34.5% iron, 45.9% fluorine, and 7.6% boron. It will be noted that there is some discrepancy in the fluorine determination, but this is due to difficulties in the analysis of fluorine in the presence of boron.

A mixture of hydrogen fluoride and the complex prepared substantially in the above manner was utilized in an anhydrous and substantially oxygen-free system for the alkylation of toluene with propylene at room temperature. This run was effected in a one-liter turbomixer autoclave. 16 grams of the complex and 259 grams of toluene were sealed in the turbomixer autoclave. Then, one gram of anhydrous hydrogen fluoride was added with stirring. Next, 37 grams of propylene were pressured into the autoclave, the time for this addition being about one hour. Stirring was continued for an additional 20 minutes at an average temperature of 25° C. At the end of this time, the total contents of the autoclave were released into a copper flask at about —70° C. containing water to quench the activity of the hydrogen fluoride. The copper flask was connected to Dry Ice traps and to a wet test meter. The contents of the flask were then stabilized at 30° C. The condensable gas was collected in Dry Ice traps. The stabilized liquid was washed with water, and then dried and distilled into fractions.

In a manner similar to that described above, another reaction was carried out with substantially the same quantities of reactants and complex and in the absence of added hydrogen fluoride. For comparative purposes the results of this run are summarized in the following table along with the run with added hydrogen fluoride:

*Table I*

|  | 1 | 2 |
|---|---|---|
| Catalyst | $HF+FeF_2BF_3$ | $FeF_2BF_3$ |
| Temperature, °C | 25 | 25 |
| Charge, Grams: |  |  |
| Hydrogen Fluoride | 1 | 0 |
| $FeF_2BF_3$ | 16 | 16 |
| $C_3H_6$ | 37 | 37 |
| Toluene | 259 | 259 |
| Conditions: |  |  |
| Min. To Add $C_3H_6$ | 60 | 60 |
| Additional Mixing, Min | 20 | 20 |
| Recovery, Gms.: |  |  |
| $C_3H_6$ | 0 | 28 |
| Toluene | 174 | 245 |
| Cymene and Higher | 96 | <1 |

An analysis of the 96 grams of cymene and higher showed that it contained 85 grams of cymene. This 85 grams of cymene is equivalent to a 72% theoretical yield based upon the propylene reacted, this yield being calculated without taking into account any losses which may have occurred. The contrast between the above two runs is readily apparent. In the presence of hydrogen fluoride and complex, alkylation of the toluene ensues. The complex alone is not a catalyst for this reaction under these conditions. If a similar run is carried out utilizing one gram of hydrogen fluoride with the above quantities of reactants, and in the absence of added complex, hydrofluorination of the propylene with the small amount of hydrogen fluoride takes place. Alkylation is not observed.

EXAMPLE II

This example illustrates the alkylation of benzene with ethylene in the presence of the catalyst comprising hydrogen fluoride and the complex of boron trifluoride and ferrous fluoride. For comparative purposes, a similar experiment was carried out but in the absence of added complex.

Both experiments were carried out substantially in the same manner as described hereinabove for the experiments in Example I. In both cases, one liter turbomixer autoclave was surrounded by a water-ice mixture so that the temperature within the autoclave approximated 0° C. From the results presented below it will be noted that in the experiment in which the complex was present that the temperature reached a maximum of 26° C. indicating that an exothermic reaction was taking place. The quantities of reactants and catalyst utilized, the reaction conditions, and results obtained are presented in the following table:

*Table II*

|  | 3 | 4 |
|---|---|---|
| Catalyst | $HF+FeF_2BF_3$ | HF |
| Temperature, °C | 0 | 0 |
| Charge, Grams: |  |  |
| Benzene | 87 | 87 |
| Nitrobenzene | 24 | 24 |
| Ethylene | 30 | 30 |
| Hydrogen Fluoride | 123 | 112 |
| $FeF_2BF_3$ | 20 | 0 |
| Conditions: |  |  |
| Minutes to Add $C_2H_4$ | 32 | 8 |
| Maximum Temp. During Addition, °C | 26 | 5 |
| Maximum Pressure Obtained, p. s. i. | 0 | 150 |
| Final Pressure, p. s. i. | 0 | 70 |
| Duration, Minutes | 83 | 97 |
| Recovery Grams: |  |  |
| Ethylene | 0 | 14.8 |
| Ethyl Fluoride | 5.0 | 8.7 |
| Benzene | 19 | 50 |
| Ethylbenzene | 27 | 19 |
| Di- and triethylbenzene | 8 | 6 |
| Hexaethylbenzene | ≃14 | 0 |

The nitrobenzene was added to the above experiments as a diluent which would be inert under the conditions utilized and which would prevent the benzene from freezing at the reaction temperature.

It is readily observed that ethylation of the benzene to a greater extent occurred in the presence of the catalyst comprising hydrogen fluoride and the complex of boron trifluoride and ferrous fluoride, than in the total absence of the complex. The absence of hexaethylbenzene in the run with hydrogen fluoride alone indicates that the catalyst comprising hydrogen fluoride and the complex is much more powerful. The hexaethylbenzene was identified by crystallization of the solid obtained in the run from ethyl alcohol, followed by a mixed melting point determination with an authentic sample of hexaethylbenzene. The melting point of the recrystallized hexaethylbendene was 127–128° C. The mixed melting point with the authentic sample of hexaethylbenzene was 127–128° C.

EXAMPLE III

This example illustrates the reaction of m-cresol with n-butyl chloride in the presence of a catalyst comprising hydrogen fluoride and a complex of boron trifluoride and ferrous fluoride. The complex was prepared in substantially the same manner as described in Example I hereinabove.

It is well known to those skilled in the art that temperatures of about 100° C. or higher are necessary to cause reaction of a normal alkyl chloride with a phenol using hydrogen fluoride as the catalytic agent. To illustrate the fact that the catalyst composition of the present invention is more powerful than is a catalyst comprising hydrogen fluoride alone, this experiment was carried out at a temperature of 40° C.

54 grams of m-cresol (0.5 mol), 47 grams of n-butyl chloride (0.5 mol), and 15 grams of complex were charged into a one liter stainless steel turbomixer autoclave which was sealed to the turbomixer and stirring begun. 146 grams of hydrogen fluoride were then pressured into the autoclave. The mixture was stirred and warmed in a water bath to 40° C. and the stirring and heating continued for 3 hours time. At the end of this time, the water bath was withdrawn, and the reaction temperature maintained by an infrared lamp for an additional three hours time at the end of which the reactor was cooled to about 1° C. by means of an ice bath. The autoclave was opened and the product recovered by pouring over supercooled ice contained in a copper beaker. This mixture was allowed to stand overnight. The hydrolyzed product was then diluted with water and extracted with a mixture of ether and pentane. The extract was washed with water, dried over sodium sulfate, filtered, and then distilled.

Over six grams of butylated m-cresol was obtained in the distillation. This product boils from about 250° to about 255° C., and has a refractive index $n_D^{20}$, of 1.5207. In contrast, the refractive index ($n_D^{20}$) of m-cresol is 1.5398.

Alkylation took place at this low temperature illustrating the operability and advantage of the catalyst of the present invention.

EXAMPLE IV

As set forth hereinabove in the specification, the olefin-acting compounds with which aromatic compounds may may be reacted by the process of my invention may comprise various olefin polymers having from 6 to 18 carbon atoms per molecule. Such olefin polymers are preferably produced by the polymerization of propylene, for example, with a catalyst formed by saturating a support such as kieselguhr with ortho-phosphoric acid. These propylene polymers, as is well known in the art, are resistant to isomerization or fragmentation during reaction with aromatic compounds. They are thus preferred over similar molecular weight polymers produced from isobutylene which polymers break into $C_4$ units during this reaction.

The propylene polymers containing from 6 to 18 carbon atoms per molecule boil within the range of from about 200° F. to about 600° F. A particularly preferred propylene tetramer fraction boils from within the range of from about 340° F. to about 420° F. and a particularly preferred propylene pentamer fraction boils within the range of from about 420° F. to about 510° F.

A sample of complex prepared substantially as described in Example I is screened to separate 10–20 mesh size particles. These particles are then disposed in a fixed bed in a reaction tube. Benzene saturated with hydrogen fluoride at room temperature is then passed over the fixed bed of complex itself maintained at room temperature. After one hour's time, this stream, just prior to passage over the bed of complex, is combined with a stream consisting of a blend of from approximately 60% to about 80% by volume of the foregoing tetramer mixture with approximately 40% to 20% of the above pentamer mixture. The mol ratio of benzene to propylene is maintained at 4:1, and liquid hourly space velocity over the fixed bed is held at 5. Substantially complete monoalkylation of the benzene is obtained in this manner, the excess benzene being recycled back to the hydrogen fluoride saturator for conversion to alkylate.

The alkylate produced in this manner can be converted to a superior detergent by subsequent sulfonation and neutralization with sodium hydroxide.

I claim as my invention:

1. A process for the alkylation of an alkylatable aromatic compound with an olefin-acting compound at alkylating conditions in the presence of a catalyst comprising free hydrogen fluoride and a preformed complex of equimolar proportions of boron trihalide and an iron group metal halide.

2. A process for the alkylation of an alkylatable monocyclic aromatic compound with an olefin-acting compound at alkylating conditions in the presence of a catalyst comprising free hydrogen fluoride and a preformed complex of equimolar proportions of boron trifluoride and an iron group metal fluoride.

3. A process for the alkylation of an alkylatable aromatic hydrocarbon with an olefin-acting compound at alkylating conditions in the presence of a catalyst comprising free hydrogen fluoride and a preformed complex of equimolar proportions of boron trifluoride and an iron group metal fluoride.

4. A process for the alkylation of an alkylatable benzene hydrocarbon with an olefin-acting compound at alkylating conditions in the presence of a catalyst comprising free hydrogen fluoride and a preformed complex of equimolar proportions of boron trifluoride and an iron group metal fluoride.

5. A process for the alkylation of an alkylatable aromatic compound with an olefin-acting compound at alkylating conditions in the presence of a catalyst comprising free hydrogen fluoride and a preformed complex of equimolar proportions of boron trifluoride and ferrous fluoride.

6. A process for the alkylation of an alkylatable monocyclic aromatic compound with an olefin-acting compound at alkylating conditions in the presence of a catalyst comprising free hydrogen fluoride and a preformed complex of equimolar proportions of boron trifluoride and ferrous fluoride.

7. A process for the alkylation of an alkylatable aromatic hydrocarbon with an olefin-acting compound at alkylating conditions in the presence of a catalyst comprising free hydrogen fluoride and a preformed complex of equimolar proportions of boron trifluoride and ferrous fluoride.

8. A process for the alkylation of an alkylatable benzene hydrocarbon with an olefin-acting compound at alkylating conditions in the presence of a catalyst comprising free hydrogen fluoride and a preformed complex of equimolar proportions of boron trifluoride and ferrous fluoride.

9. A process for the alkylation of benzene with an olefin-acting compound at alkylating conditions in the presence of a catalyst comprising free hydrogen fluoride and a preformed complex of equimolar proportions of boron trifluoride and an iron group metal fluoride.

10. A process for the alkylation of toluene with an olefin-acting compound at alkylating conditions in the presence of a catalyst comprising free hydrogen fluoride and a preformed complex of equimolar proportions of boron trifluoride and an iron group metal fluoride.

11. A process for the alkylation of an alkylatable phenol with an olefin-acting compound at alkylating conditions in the presence of a catalyst comprising free hydrogen fluoride and a preformed complex of equimolar proportions of boron trifluoride and an iron group metal fluoride.

12. A process for the alkylation of benzene with a monoolefinic hydrocarbon at alkylating conditions in the presence of a catalyst comprising free hydrogen fluoride and a preformed complex of equimolar proportions of boron trifluoride and an iron group metal fluoride.

13. A process for the alkylation of toluene with a monoolefinic hydrocarbon at alkylating conditions in the presence of a catalyst comprising free hydrogen fluoride and a preformed complex of equimolar proportions of boron trifluoride and ferrous fluoride.

14. A process for the alkylation of an alkylatable phenol with an alkyl halide at alkylating conditions in the presence of a catalyst comprising free hydrogen fluoride and a preformed complex of equimolar proportions of boron trifluoride and an iron group metal fluoride.

15. A process for the alkylation of m-cresol with an olefin-acting compound at alkylating conditions in the presence of a catalyst comprising free hydrogen fluoride and a preformed complex of equimolar proportions of boron trifluoride and an iron group metal fluoride.

16. A process for the alkylation of m-cresol with an alkyl halide at alkylating conditions in the presence of a catalyst comprising free hydrogen fluoride and a preformed complex of equimolar proportions of boron trifluoride and an iron group metal fluoride.

17. A process for the alkylation of benzene with ethylene at alkylating conditions in the presence of a catalyst comprising free hydrogen fluoride and a preformed complex of equimolar proportions of boron trifluoride and ferrous fluoride.

18. A process for the alkylation of toluene with propylene at alkylating conditions in the presence of a catalyst comprising free hydrogen fluoride and a preformed complex of equimolar proportions of boron trifluoride and ferrous fluoride.

19. A process for the alkylation of an alkylatable phenol with an olefin-acting compound at alkylating conditions in the presence of a catalyst comprising free hydrogen fluoride and a preformed complex of equimolar proportions of boron trifluoride and ferrous fluoride.

20. A process for the alkylation of m-cresol with n-butyl chloride at alkylating conditions in the presence of a catalyst comprising free hydrogen fluoride and a preformed complex of equimolar proportions of boron trifluoride and ferrous fluoride.

References Cited in the file of this patent

UNITED STATES PATENTS

| | | |
|---|---|---|
| 2,408,753 | Burk | Oct. 8, 1946 |
| 2,411,047 | Linn et al. | Nov. 12, 1946 |
| 2,418,023 | Frey | Mar. 25, 1947 |
| 2,459,775 | Passino | Jan. 18, 1949 |
| 2,470,144 | Clarke | May 17, 1949 |
| 2,709,193 | Clough | May 24, 1955 |

FOREIGN PATENTS

| | | |
|---|---|---|
| 486,355 | Great Britain | June 2, 1938 |